United States Patent

Sasaki

(10) Patent No.: US 11,460,561 B2
(45) Date of Patent: Oct. 4, 2022

(54) SURVEYING DEVICE, AND CALIBRATION METHOD AND CALIBRATION PROGRAM FOR SURVEYING DEVICE

(71) Applicant: TOPCON CORPORATION, Tokyo (JP)

(72) Inventor: You Sasaki, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 979 days.

(21) Appl. No.: 16/205,420

(22) Filed: Nov. 30, 2018

(65) Prior Publication Data

US 2019/0170865 A1 Jun. 6, 2019

(30) Foreign Application Priority Data

Dec. 5, 2017 (JP) .............................. JP2017-233469

(51) Int. Cl.
*G01S 7/497* (2006.01)
*G01C 3/02* (2006.01)
(Continued)

(52) U.S. Cl.
CPC ................ *G01S 7/497* (2013.01); *G01C 3/02* (2013.01); *G01C 15/002* (2013.01); *G01C 25/00* (2013.01)

(58) Field of Classification Search
CPC ......... G01S 7/497; G01C 3/02; G01C 15/002; G01C 25/00
See application file for complete search history.

(56) References Cited

U.S. PATENT DOCUMENTS 7,861,423 B2    1/2011   Kumagai et al.
8,767,190 B2    7/2014   Hall
(Continued)

FOREIGN PATENT DOCUMENTS

EP            2620745 A1    7/2013
JP       2008-268004 A    11/2008
(Continued)

OTHER PUBLICATIONS

Extended Search Report dated Apr. 29, 2019, in connection with European Patent Application No. 18206442.8, 5 pgs.

*Primary Examiner* — Yuqing Xiao
*Assistant Examiner* — Benjamin Richard Hebert
(74) *Attorney, Agent, or Firm* — Chiesa Shahinian & Giantomasi PC

(57) ABSTRACT

A technique is provided to enable check of calibrated condition of a total station (TS) having a laser scanner at a surveying site. The TS includes an optical system, a laser positioning part, a plane equation calculator, a laser scanner, a separation amount calculator, and an exterior orientation parameter calculator. The laser positioning part emits laser light on an object via the optical system to position the object. The plane equation calculator calculates an equation of a specific plane on the basis of result from the laser positioning part. The laser scanner scans the specific plane with laser light to obtain scanning points. The separation amount calculator calculates a separation amount of the respective scanning points from the specific plane. The exterior orientation parameter calculator calculates exterior orientation parameters of one or both of the laser positioning part and the laser scanner so that the separation amount will be small.

13 Claims, 6 Drawing Sheets

(51) Int. Cl.
    *G01C 15/00*    (2006.01)
    *G01C 25/00*    (2006.01)

(56) References Cited

U.S. PATENT DOCUMENTS

| | | |
|---|---|---|
| 2009/0235541 A1 | 9/2009 | Kumagai et al. |
| 2009/0241358 A1 | 10/2009 | Ohtomo et al. |
| 2010/0256940 A1 | 10/2010 | Ogawa et al. |
| 2012/0242830 A1 | 9/2012 | Kumagai et al. |
| 2015/0042977 A1 | 2/2015 | Siercks et al. |
| 2015/0293224 A1 | 10/2015 | Eldada et al. |
| 2018/0068492 A1 | 3/2018 | Morikawa et al. |
| 2019/0145769 A1* | 5/2019 | Sasaki .................... G01C 15/00 |

FOREIGN PATENT DOCUMENTS

| | | |
|---|---|---|
| JP | 2009-229192 A | 10/2009 |
| JP | 2010-151682 A | 7/2010 |
| JP | 2012-202821 A | 10/2012 |
| JP | 5124319 B2 | 1/2013 |
| JP | 2013190272 A | 9/2013 |
| JP | 2018-041192 A | 3/2018 |

\* cited by examiner

SURVEYING DEVICE, AND CALIBRATION METHOD AND CALIBRATION PROGRAM FOR SURVEYING DEVICE

CROSS-REFERENCE TO RELATED APPLICATION

This application is based upon and claims benefit of priority from Japanese Patent Application No. 2017-233469, filed Dec. 5, 2017, the entire contents of which are incorporated herein by reference.

BACKGROUND OF THE INVENTION

The present invention relates to a technique for calibrating a surveying device.

A publicly known surveying device may include a total station (TS). Such TS is disclosed in Japanese Unexamined Patent Applications Laid-Open Nos. 2009-229192 and 2012-202821, for example. In addition, a laser scanner that performs high-speed laser scanning by rotating an optical system is publicly known. Such a laser scanner is disclosed in U.S. Pat. No. 8,767,190, for example. Another publicly known laser scanner performs electronic control of a scanning direction. This laser scanner is disclosed in U.S. Patent Application Publication No. 2015/0293224, for example.

The TS has a laser distance measuring function, which is known as being useable to make the TS also useable as a laser scanner. This laser scanner performs laser scanning in laser distance measurement with respect to each point, while an optical system of the TS moves vertically and laterally. This method is simple and easy, but is inferior to a dedicated laser scanner in scanning speed and scanning resolution.

The laser scanner, as disclosed in, for example, U.S. Pat. No. 8,767,190, can perform high-speed scanning but has a positioning accuracy for each of the scanned points inferior to that of a laser positioning function of a TS. This is due to high speed scanning of the dedicated laser scanner. That is, a timing of measuring a distance by using laser distance measuring light differs from a timing of measuring an emitting direction of the laser distance measuring light, and this difference generates a measurement error and decreases positioning accuracy. In view of this, in order to obtain advantages of both the TS and the dedicated laser scanner, a highly accurate laser distance measuring unit of the TS, and the function to make the TS useable as the laser scanner, are separated as independent units and are combined together.

In this condition, the position of optical origin of the highly accurate laser distance measuring unit is physically separated from the position of optical origin of a unit having the separated function for the laser scanner. The separated amount is preliminarily set as an offset value at the time of designing in order to enable correction of positioning data, but this is not sufficient, and calibration is required after the product is completed. Normally, calibration is performed at the time a product is shipped. The calibration can also be performed as a service of a manufacturer or a maintenance company after sale. However, the calibration requires a dedicated apparatus and complicated operation.

The calibration described above is normally performed in presupposed specific circumstances, and therefore, the calibrated condition may not be appropriate in actual surveying circumstances. Moreover, the calibrated condition can change over time. For these reasons, the calibration should be performed regularly or be performed before use.

SUMMARY

In view of these circumstances, an object of the present invention is to provide a technique that enables calibration of a TS having a laser scanner at a surveying site or at other sites.

An aspect of the present invention provides a surveying device including an optical system, a laser positioning part, a plane determining part, a laser scanner, a separation amount calculator, and an exterior orientation parameter calculator. The optical system is used for sighting a positioning target. The laser positioning part emits laser light via the optical system to the positioning target to position the positioning target. The plane determining part determines a location of a specific plane on the basis of a result of the positioning performed by the laser positioning part. The laser scanner performs laser scanning of the specific plane to obtain multiple scanning points. The separation amount calculator calculates a separation amount of the respective multiple scanning points obtained by the laser scanner, from the specific plane of which the location is determined by the plane determining part. The exterior orientation parameter calculator calculates exterior orientation parameters of one or both of the laser positioning part and the laser scanner on the basis of the calculated separation amount.

Another aspect of the present invention provides a surveying device including an optical system, a laser positioning part, a plane determining part, a laser scanner, a separation amount calculator, and an appropriateness judging part. The optical system is used for sighting a positioning target. The laser positioning part emits laser light via the optical system to the positioning target to position the positioning target. The plane determining part determines a location of a specific plane on the basis of a result of the positioning performed by the laser positioning part. The laser scanner performs laser scanning of the specific plane to obtain multiple scanning points. The separation amount calculator calculates a separation amount of the respective multiple scanning points obtained by the laser scanner, from the specific plane of which the location is determined by the plane determining part. The appropriateness judging part judges an appropriateness of a calibrated condition relating to exterior orientation parameters of the laser positioning part and the laser scanner, on the basis of the calculated separation amount.

In one example of the present invention, each of multiple planes having different normal vectors is preferably selected as the specific plane. In one example of the present invention, the laser positioning part preferably positions three or more points on the specific plane to determine the location of the specific plane. In this case, a distribution area of the three or more points and a laser scanning area of the laser scanner preferably overlap. Moreover, the laser scanning area of the laser scanner is preferably set within the distribution area of the three or more points.

In one example of the present invention, the surveying device preferably further includes a noise eliminating part that calculates a fitting plane to which the multiple scanning points fit, and the noise eliminating part eliminates a scanning point, of which a separation amount from a fitting plane is a specified value or greater, as a noise point from among the multiple scanning points. Moreover, in one example of the present invention, the separation amount is preferably a distance between the specific plane, of which the location is identified by the plane determining part, and the fitting plane that fits to the multiple scanning points obtained by the laser scanner.

Yet another aspect of the present invention provides a calibration method of a surveying device. The method includes determining a location of a specific plane by positioning three or more points on the specific plane by using a laser positioning part, and performing laser scanning of the specific plane by a laser scanner to obtain multiple scanning points. The method also includes calculating a separation amount of the respective multiple scanning points obtained by the laser scanning, from the specific plane of which the location is determined, and calculating exterior orientation parameters of one or both of the laser positioning part and the laser scanner on the basis of the separation amount.

Yet another aspect of the present invention provides a non-transitory computer recording medium storing computer executable instructions for calibrating a surveying device. The computer executable instructions, when executed by a computer processor, cause the computer processor to determine a location of a specific plane by positioning three or more points on the specific plane by using a laser positioning part, and perform laser scanning of the specific plane by a laser scanner to obtain multiple scanning points. The computer executable instructions also cause the computer processor to calculate a separation amount of the respective multiple scanning points obtained by the laser scanning, from the specific plane of which the location is determined, and calculate exterior orientation parameters of one or both of the laser positioning part and the laser scanner on a basis of the separation amount.

The present invention provides a technique that enables check of a calibrated condition of a TS having a laser scanner at a surveying site or at other sites.

DETAILED DESCRIPTION

Overview

Figure 1:
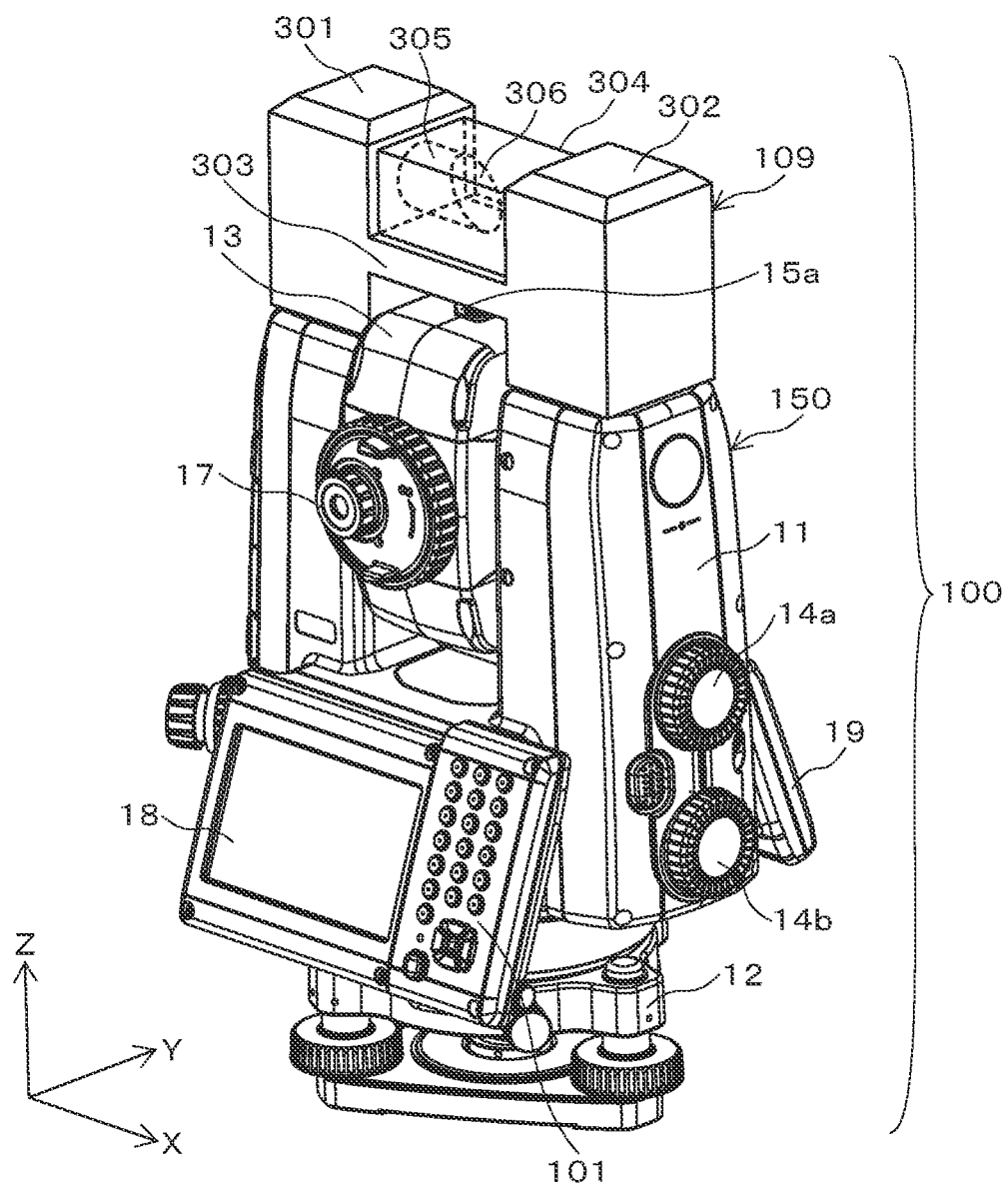
FIG. 1 is a perspective view of a total station (TS) using the present invention.
Figure 2:
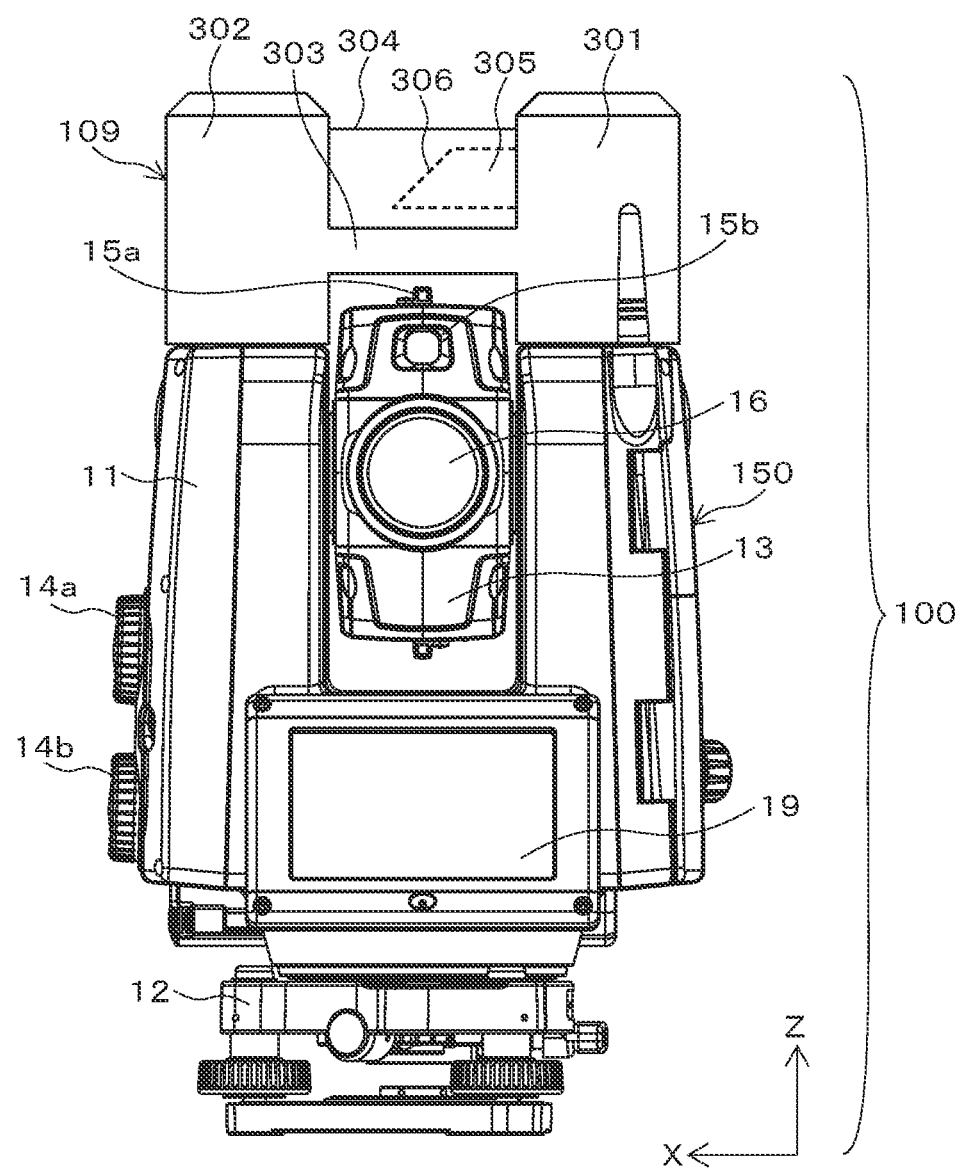
FIG. 2 is a front view of the TS using the present invention.

FIG. 1 shows a perspective view of a total station (TS) 100 having a laser scanner and using the present invention. FIG. 2 shows a front view of the TS 100. The TS 100 has the same functions as those of an ordinary TS, except that the TS 100 has a laser scanner 109 and has a function of performing a processing relating to calibration of a positioning function of the TS 100 and calibration of the laser scanner 109. The laser scanner 109 is described later. The positioning function of the TS 100 is performed by a laser positioning part 200, which is described later. A detailed structure of a TS is disclosed in Japanese Unexamined Patent Applications Laid-Open Nos. 2009-229192 and 2012-202821, for example.

The TS 100 has a main body 150 and a laser scanner 109 in a composite manner. The TS 100 has a main unit 11 that is held in a horizontally rotatable manner by a base 12. The base 12 may be fixed on a top of a tripod (not shown). The main unit 11 has an approximately U-shape with two extending parts that extend upwardly as viewed from a Y-axis direction. The main unit 11 also has a movable part 13 that is held between the two extending parts so as to be controllable in a vertical angle. The vertical angle is composed of an elevation angle and a depression angle.

The main unit 11 is rotated relative to the base 12 by a motor. That is, the horizontal rotation angle of the main unit 11 relative to the base 12 is controlled by the motor. The vertical angle of the movable part 13 is also controlled by a motor. Driving to control the horizontal rotation angle and the vertical angle is performed by a vertical and horizontal rotation driving unit 106 that is incorporated in the main unit 11. The vertical and horizontal rotation driving unit 106 is shown in the block diagram in FIG. 3.

The main unit 11 has a horizontal rotation angle controlling dial 14a and a vertical angle controlling dial 14b arranged thereon. The horizontal rotation angle controlling dial 14a is operated to adjust the horizontal rotation angle of the main unit 11 and the movable part 13. The vertical angle controlling dial 14b is operated to adjust the vertical angle of the movable part 13.

The movable part 13 has a rectangular cylindrical sighting unit 15a for approximate sighting, arranged on a top thereof. The movable part 13 also has an optical sighting unit 15b with a visual field narrower than that of the sighting unit 15a and has a telescope 16 that can be collimated at a high accuracy.

An image captured by the sighting unit 15b and the telescope 16 can be visually recognized by looking into an eyepiece 17. The telescope 16 also serves as an optical system for distance measuring laser light and for tracking light. The tracking light is used to track and capture an object of which a distance is to be measured. An example of the object includes a target using a dedicated reflective prism. The distance measuring laser light is abbreviated as "distance measuring light" hereinafter. The optical system is designed so that the optical axes of the distance measuring light and the tracking light will coincide with an optical axis of the telescope 16. The structure of this part is the same as that of a commercially available TS.

The main unit 11 has displays 18 and 19 attached thereto. The display 18 is integrated with a controller 101. The controller 101 has a numeric keypad, a cross operation button, and other operation parts arranged thereon, which are used to perform various operations relating to the TS 100 and input data. The displays 18 and 19 display various pieces of information necessary to operate the TS 100, surveying data, and other information. These two displays are mounted in order to enable viewing the display from either the front side or the back side without having to rotate the main unit 11.

The main unit 11 has the laser scanner 109 that is fixed on a top. The laser scanner 109 has a first column 301 and a second column 302. The first column 301 and the second column 302 are connected by a connecting part 303. The space over the connecting part 303 between the first column 301 and the second column 302 is covered with a protective case 304. The protective case 304 is made of a member that transmits laser scanning light. The protective case 304 houses a rotating part 305 that protrudes from the first column 301 in an X-axis direction. An end of the rotating part 305 is obliquely cut off, and this end has a tilt mirror 306 fixed thereon.

The rotating part 305 is driven to be rotated around the X-axis by a motor contained in the first column 301. The first column 301 contains, in addition to the motor, a driving circuit for driving the motor, a control circuit for the driving circuit, a sensor for measuring a rotation angle of the rotating part 305, and a peripheral circuit of the sensor.

The second column 302 contains a light emitting part that generates multiple pulsed beams of laser scanning light, a light receiving part that receives laser scanning light reflected back from an object, an optical system for the light emitting part and the light receiving part, and a distance calculator that calculates a distance to a scanning point. The laser scanner 109 further contains a scanning-point location calculator that calculates three-dimensional coordinates of a scanning point on the basis of a rotation angle of the rotating part 305, a horizontal rotation angle of the main unit 11, and a distance to the scanning point from the main unit 11. The laser scanning light is emitted from an inside of the second column 302 to the tilt mirror 306 and is reflected thereat to exit to the outside via the transparent protective case 304. The laser scanning light that is reflected back from an object reverses the path of the emitted light and is received by the light receiving part in the second column 302.

The point that reflects the laser scanning light is positioned as a scanning point by referring to a light emission timing and a light reception timing of the laser scanning light as well as a rotation angle of the rotating part 305 and a horizontal rotation angle of the main unit 11 at each of these timings. The principle of the positioning is the same as that for the laser positioning part 200, which is described later.

The multiple pulsed beams of the laser scanning light are intermittently emitted from the transparent protective case 304 to the outside, in a fan shape with an expansion angle of approximately 20 to 45 degrees along an extending direction of the rotation axis of the rotating part 305. At this time, the laser scanning light is emitted while the rotating part 305 rotates. Thus, the fan-shaped laser scanning light with a width of some degree in the X-axis direction is emitted from the laser scanner 109 while scanning around the X-axis. In the meantime, the laser scanning light is emitted while the main unit 11 is horizontally rotated around a Z-axis. As a result, the entirety of the surroundings or a necessary area is subjected to the laser scanning. In one example, the laser scanning light may be composed of one pulsed beam, and laser scanning may be performed along a vertical plane including the optical axis of the telescope 16.

The technique relating to the laser scanner is disclosed in Japanese Unexamined Patent Applications Laid-Open Nos. 2010-151682 and 2008-268004 and U.S. Pat. No. 8,767,190, for example. The laser scanner can be one that electronically performs scanning, as disclosed in U.S. Patent Application Publication No. 2015/0293224.

Block Diagram

Figure 3:
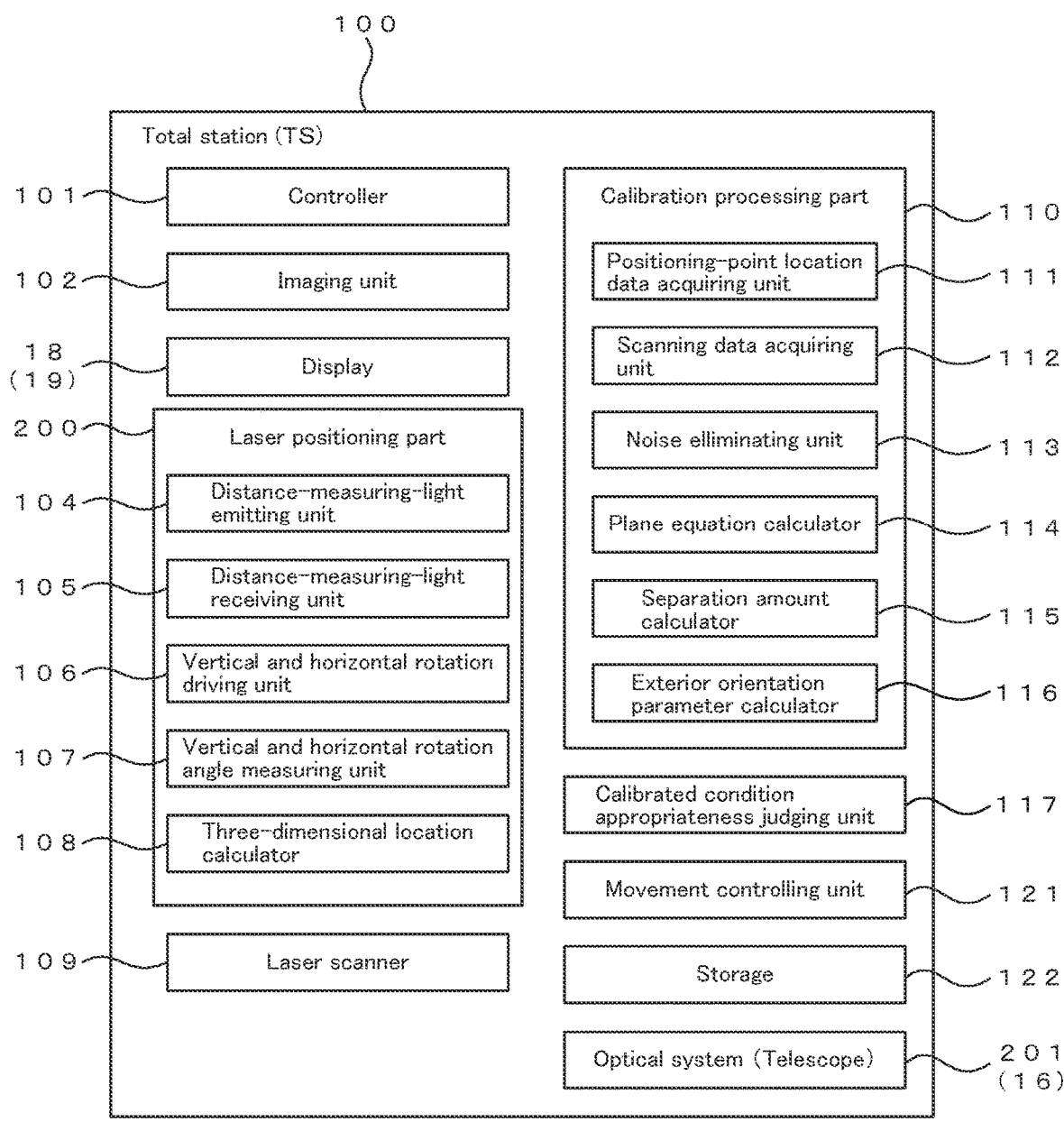
FIG. 3 is a block diagram of the TS using the present invention.

FIG. 3 shows a block diagram of the TS 100. The basic functions of the TS 100 as a total station are the same as those of an existing total station. The TS 100 differs from an existing total station in that the TS 100 is combined with the independent laser scanner 109 and in that the TS 100 has a function of performing calibration between the combined laser scanner 109 and the positioning function of the TS 100. The positioning function of the TS 100 is performed by the laser positioning part 200.

The TS 100 includes a controller 101, an imaging unit 102, displays 18 and 19, a laser positioning part 200, a laser scanner 109, a calibration processing part 110, a calibrated condition appropriateness judging unit 117, a movement controlling unit 121, a storage 122, and an optical system 201.

The laser positioning part 200 performs positioning that is a function originally provided to a TS. The laser positioning part 200 includes a distance-measuring-light emitting unit 104, a distance-measuring-light receiving unit 105, a vertical and horizontal rotation driving unit 106, a vertical and horizontal rotation angle measuring unit 107, and a three-dimensional location calculator 108. The optical system 201 includes the sighting unit 15b (refer to FIG. 2), the telescope 16 (refer to FIG. 2), an optical system of the laser positioning part 200, an optical system of the imaging unit 102, and an optical system containing a light path of tracking light (not shown).

The optical system 201 is configured in a similar manner as in an ordinary TS and includes various types of lenses, a mirror, a dichroic mirror for separating and combining light paths, a half-mirror, a polarizing mirror, or other parts. With use of the optical system 201, the distance measuring light emitted from the distance-measuring-light emitting unit 104 passes through the telescope 16 and reaches an object to be positioned, and the distance measuring light is reflected back from the object through the telescope 16 and is received by the distance-measuring-light receiving unit 105. The optical system 201 conducts an image captured by the telescope 16, to the eyepiece 17 and to the imaging unit 102.

The TS 100 also includes a tracking light emitting unit, a tracking light receiving unit, and a track controlling unit. The tracking light emitting unit emits tracking light for tracking a target such as a reflective prism. The tracking light receiving unit receives the tracking light that is reflected back from the target. The track controlling unit outputs a control signal to the vertical and horizontal rotation driving unit 106 so that the tracking light will be captured at a collimation position in a visual field of the telescope 16. These structures are the same as those of an existing commercially available product, and therefore, detailed descriptions thereof are not given. The structure relating to the tracking light of the TS is disclosed in, for example, Japanese Patent No. 5124319.

The controller 101 receives contents of operation of the TS 100 input by an operator. The TS 100 is operated through a button switch or other operation parts of the TS 100. A tablet or a smartphone can also be used as a controller. In this case, dedicated application software may be installed in a tablet or a smartphone to make the tablet or the smartphone function as a control means of the TS 100.

The imaging unit 102 images an image captured by the telescope 16. The imaging is performed by, for example, a CCD imaging sensor or a CMOS imaging sensor. The displays 18 and 19 display images imaged by the imaging unit 102, information necessary to operate the TS 100, information relating to movement of the TS 100 such as distance measuring data and direction of a target, and other information. Each of the displays 18 and 19 may use a liquid crystal display, an electroluminescent (EL) display, or other display. The displays 18 and 19 also display a 3D image formed of point cloud data obtained by the laser scanner 109. The 3D display of the point cloud data is disclosed in, for example, Japanese Patent Application No. 2016-173468.

The distance-measuring-light emitting unit 104 emits laser light for measuring a distance, which is referred to as distance measuring light in this embodiment. The distance measuring light passes through the telescope 16 in the same axis direction as the optical axis of the telescope 16. The distance-measuring-light receiving unit 105 receives the distance measuring light reflected back from an object through the telescope 16. The distance-measuring-light receiving unit 105 uses an optical measuring device such as a photodiode.

The optical axis of the distance measuring light, which is emitted from the distance-measuring-light emitting unit 104, and the optical axis of the distance measuring light, which is reflected back from the object to the TS 100 and enters the distance-measuring-light receiving unit 105, are combined by using the optical system, such as the dichroic mirror, the half-mirror, and the polarizing mirror.

The vertical and horizontal rotation driving unit 106 drives to horizontally rotate the main unit 11 and drives to vertically rotate the movable part 13. The vertical and horizontal rotation driving unit 106 includes a motor, a gear mechanism, and a driving circuit for performing these drivings.

The vertical and horizontal rotation angle measuring unit 107 measures a horizontal rotation angle of the main unit 11 and measures a vertical angle of the movable part 13 in terms of an elevation angle and a depression angle. The measurement of the angles is performed by a rotary encoder. The horizontal rotation angle is measured, for example, in a clockwise direction starting from the direction of north as 0 degrees as viewed downwardly. The elevation angle is measured on the condition that an elevation direction starting from the horizontal direction as 0 degrees is a positive angle, and the depression angle is measured on the condition that a depression direction starting from the horizontal direction as 0 degrees is a negative angle.

The three-dimensional location calculator 108 calculates values of three-dimensional coordinates of an object from a distance to the object and an emitting direction of the distance measuring light. The object is a target of which the distance is to be measured, such as a reflection point that reflects the distance measuring light. The distance is calculated on the basis of a time-of-flight of the distance measuring light from the distance-measuring-light emitting unit 104. The three-dimensional coordinates of the object of which the distance is to be measured is obtained in terms of values in a coordinate system having the origin at the TS 100. This coordinate system is referred as a "TS coordinate system" hereinafter.

Normally, the TS 100 is installed at a location of which coordinates in an absolute coordinate system are known, and therefore, coordinates of location data obtained in the TS coordinate system can be converted into coordinates of the absolute coordinate system by performing parallel movement and, as necessary, by also performing rotation. The absolute coordinate system is a global coordinate system fixed relative to the ground. For example, a GNSS normally uses an absolute coordinate system. Typically, a map is described in the absolute coordinate system. The absolute coordinate system uses, for example, longitude, latitude, and elevation above mean sea level to specify a location.

The distance from the TS 100 to the object of which a distance is to be measured is calculated as follows. The TS 100 incorporates a reference light path with a known light path length for conducting light emitted from the distance-measuring-light emitting unit 104. The light from the distance-measuring-light emitting unit 104 is divided into two beams, and one beam advances from the telescope 16 through a light path connecting the telescope 16, a positioning point, the telescope 16, and the distance-measuring-light receiving unit 105, in this order, whereas the other beam advances from the reference light path to the distance-measuring-light receiving unit 105. The distance measuring light is pulsed light, and therefore, the one beam of the distance measuring light advancing through the light path and the other beam of the distance measuring light advancing the other light path are received at different timings by the distance-measuring-light receiving unit 105. This generates a phase difference between waveforms that are measured by the distance-measuring-light receiving unit 105. The phase difference is used to calculate the distance to the reflection point.

Meanwhile, the direction of the reflection point that reflects the distance measuring light, as viewed from the TS 100, is obtained in terms of angle by the vertical and horizontal rotation angle measuring unit 107. The distance and direction determined provides a three-dimensional location of the reflection point that reflects the distance measuring light. The three-dimensional location is represented by using the TS 100 as reference or the origin. This process is performed by the three-dimensional location calculator 108. Thus, the laser positioning part 200 measures the location of the positioning point.

The laser scanner 109 obtains scanning points that are scanned by means of laser scanning, that is, obtains point cloud data that contains laser scanning point clouds obtained by means of laser scanning. The range of the laser scanning can be set as desired.

The calibration processing part 110 performs calibration relating to exterior orientation parameters (location and direction) between the laser positioning part 200 and the laser scanner 109. In this embodiment, for example, the calibration is performed to correct a dislocation from an initial calibrated condition. In this case, the calibration is performed as follows: data of location, which is positioned using a plane by the laser positioning part 200, and the point cloud data, which is obtained by the laser scanner 109, are compared to evaluate a dislocation, and exterior orientation parameters of the laser scanner 109 are adjusted so that the dislocation will be minimum.

Basically, at the stage of shipping, various kinds of calibrations relating to the TS 100 are already completed, and thus, the calibration relating to the relationship of the exterior orientation parameters between the laser positioning part 200 and the laser scanner 109 is also preliminarily performed. Nevertheless, due to variation with time in the calibrated conditions and due to difference of the conditions in use from the conditions in use that were assumed in the preliminary calibration, calibration should be performed again in some cases. In such cases, a calibration process is performed by using the calibration processing part 110.

The calibration processing part 110 is an arithmetic proceeding part that functions as a computer. The calibration processing part 110 includes a positioning-point location data acquiring unit 111, a scanning data acquiring unit 112, a noise eliminating unit 113, a plane equation calculator 114, a separation amount calculator 115, and an exterior orientation parameter calculator 116. Each of these functional units may be embodied by a dedicated integrated circuit using an ASIC, FPGA, or other component or may be implemented by causing a CPU to execute a program. Alternatively, the calibration processing part 110 may be embodied by combining a microcomputer and a dedicated arithmetic circuit. The calibration processing part 110 may also be embodied by using a personal computer (PC) connected to the outside.

The positioning-point location data acquiring unit 111 acquires location data of points positioned by the laser positioning part 200. In one example according to the technique of the disclosure, the laser positioning part 200 is used to position three or more points on a target planar plane, and the positioning-point location data acquiring unit 111 acquires data of locations of the positioned three or more points.

The scanning data acquiring unit 112 acquires location data of scanning points that are obtained by the laser scanner 109. In one example according to the technique of the disclosure, laser scanning is performed on the same target plane as the positioning-point location data acquiring unit 111, and the resultant data of the laser scanning is acquired by the scanning data acquiring unit 112.

Figure 4:
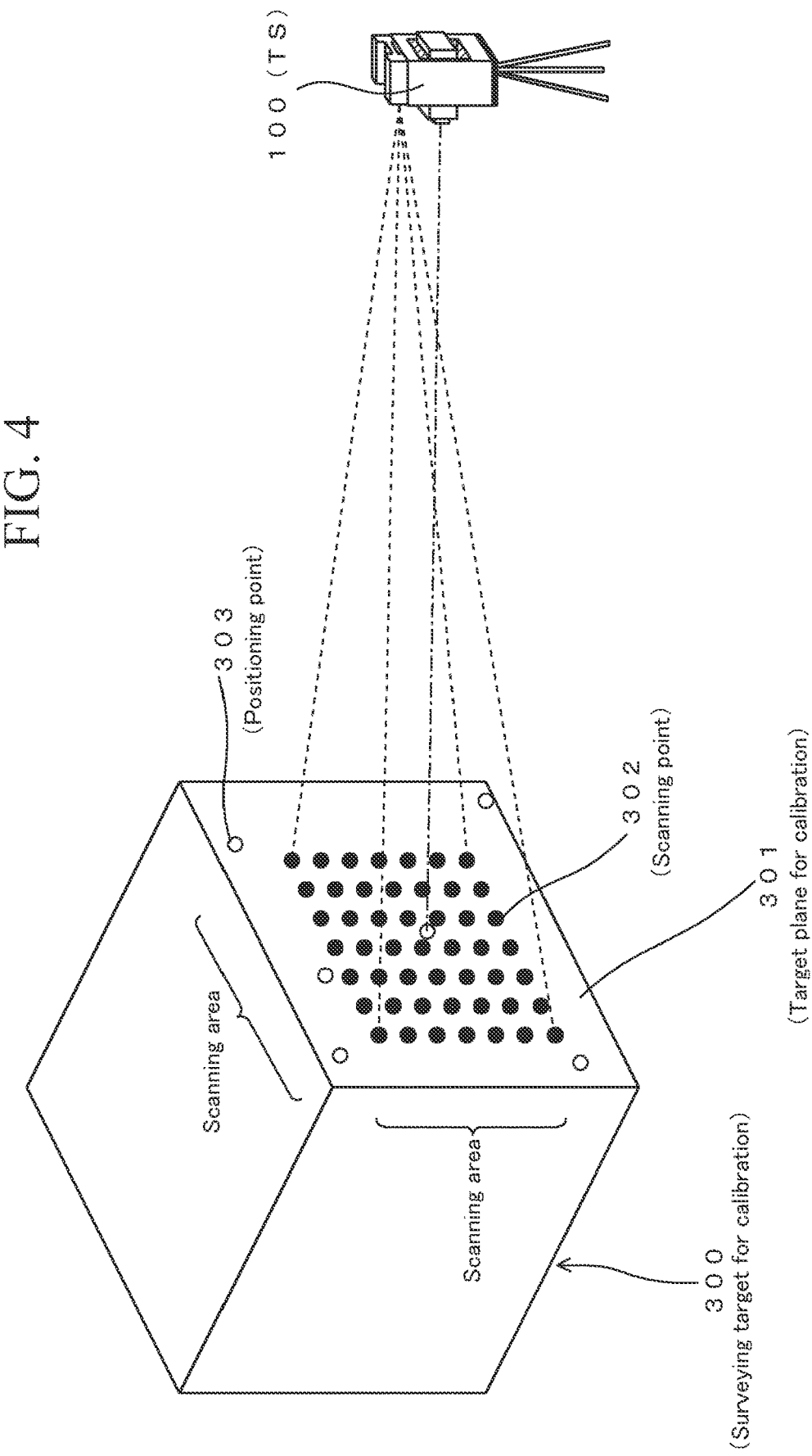
FIG. 4 illustrates a situation in which a scanning area is set within a distribution area of positioning points.

Hereinafter, the plane to be targeted by the positioning-point location data acquiring unit 111 is referred as a "first plane". The center of an area of the laser scanning is made to coincide with the center of the first plane with the most possible accuracy. The center of the first plane is set at the center of gravity of the three or more positioning points that are used for obtaining the first plane. The scanning area is set inside a distribution area of the positioning points that are used for determining the first plane. An example of this situation is shown in FIG. 4. FIG. 4 illustrates a situation of using one plane of a cubic object 300, which is prepared as a target for calibration, as a target plane 301 for calibration serving as the first plane. The distribution area of multiple positioning points used to obtain the first plane and the scanning area of the laser scanner 109 shall be at least partially overlapped. A plane that is close to a complete flat plane as much as possible is selected as the target plane 301 for the calibration.

Setting the laser scanning area to satisfy the above conditions increases the calculation accuracy of the exterior orientation parameters of the laser scanner 109. This calculation is described later. On the other hand, in a case in which distribution locations of the points used for obtaining the first plane are separated from the laser scanning area, as the separation amount increases, the accuracy of the calibration decreases because the calibration is performed on different observation references.

The noise eliminating unit 113 eliminates noise points from among the multiple scanning points obtained by the laser scanner 109. The elimination of a noise point is performed as described below. First, multiple scanning points of a scanning point cloud are obtained as targets. Thereafter, a plane equation that fits to the obtained scanning point cloud is calculated, and a plane is obtained. A distance of each of the scanning points from the obtained plane is calculated in terms of absolute value. At this time, a distance in a direction perpendicular to the plane is calculated. After the distance of each of the scanning points from the plane is calculated, the scanning point with the distance of a threshold value or greater is eliminated as noise. The threshold value is set in consideration of the accuracy of the laser scanner 109. For example, in a case in which the laser scanner 109 has a distance measuring accuracy of 5 mm, the threshold value is set at 2.5 mm.

The plane equation calculator 114 calculates a plane equation that fits to the three or more points, on the basis of the location data of the three or more points acquired by the positioning-point location data acquiring unit 111.

For example, a general formula of the plane equation is: ax+by +cz+d=0. The coordinate values of the three more points are substituted into the general formula, and simultaneous equations are solved, whereby a plane equation of a plane containing the three or more points is obtained. This plane equation is described in a TS coordinate system.

In a case in which four or more positioning points are used, and there is a point that is not contained in a plane among these positioning points, a plane equation is calculated so that an integrated value of separation amounts of the positioning points from the plane will be minimum. Alternatively, a point that is not contained in a plane may be ignored, and a plane equation may be calculated by using only positioning points that exist on the plane.

The separation amount calculator 115 calculates a separation amount of the scanning point, which is acquired by the scanning data acquiring unit 112, from the plane calculated by the plane equation calculator 114. The separation amount is represented by a distance in terms of absolute value. The calculation may use all or some of the scanning points that are obtained from the scanning data. However, using a greater number of the scanning points enables increasing final accuracy. The separation amount is obtained by measuring a length of a perpendicular to the plane, of the scanning point, that is, by measuring a distance in a direction perpendicular to the plane between the scanning point and the plane.

Figure 5:
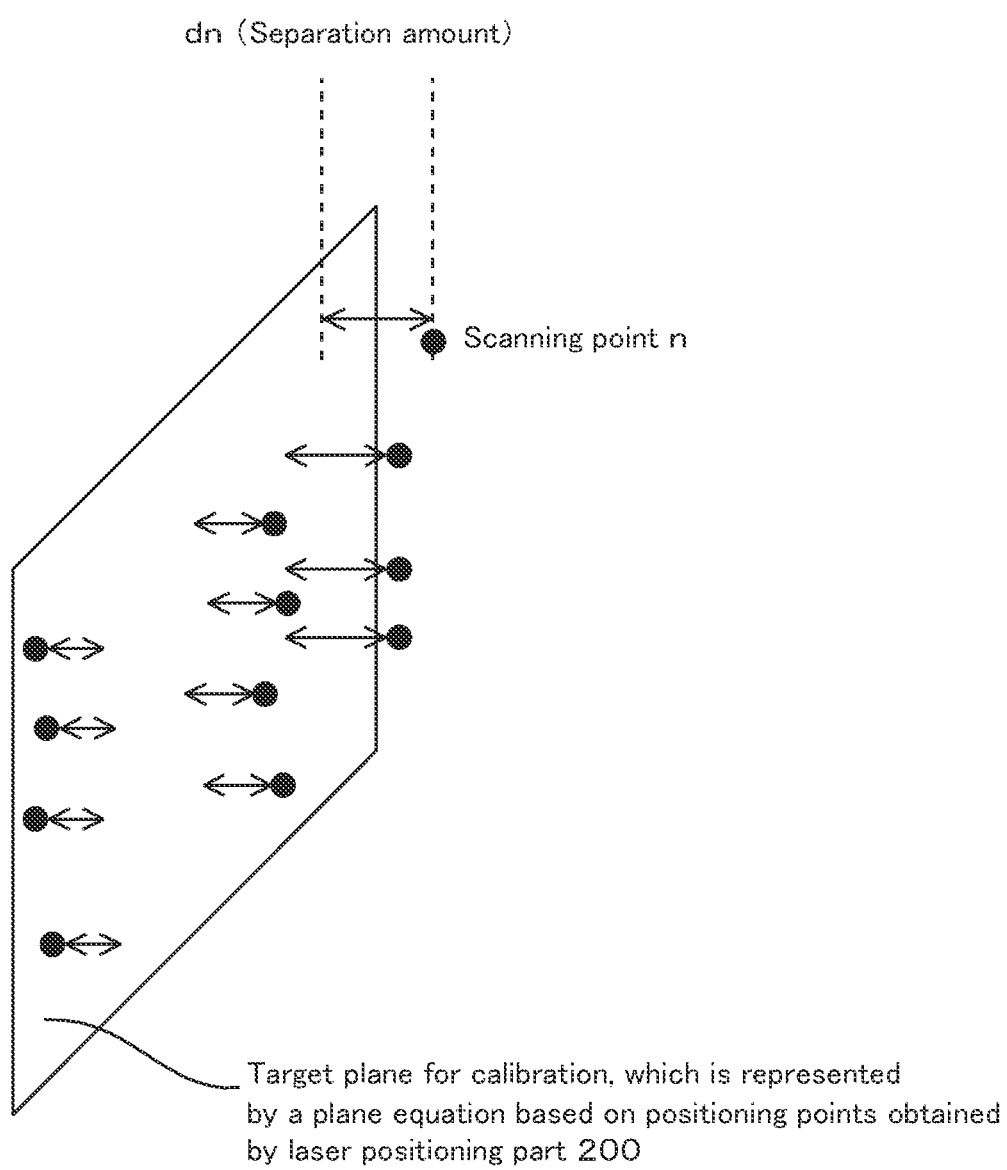
FIG. 5 illustrates a relationship between a scanning point and a plane that is based on multiple points acquired by a positioning-point location data acquiring unit 111 and that is used for calibration.

FIG. 5 illustrates a distance dn between a scanning point n (n is a natural number of 1, 2, 3, 4, . . . ) and a plane, which is calculated by the plane equation calculator 114. In this case, the distance dn represents the separation amount of each of the scanning points from the plane, which is calculated by the plane equation calculator 114. As the separation amount increases, the difference of the scanning point from the plane, which is calculated by the plane equation calculator 114, increases, and the degree of coincidence therebetween is lower. This plane is a target plane for the calibration determined on the basis of the positioning data from the laser positioning part 200.

The exterior orientation parameter calculator 116 adjusts values of the exterior orientation parameters (location and attitude) of the laser scanner 109 so that the separation amount dn, which is calculated by the separation amount calculator 115, will be minimum. The following describes an example of a process performed by the exterior orientation parameter calculator 116.

First, it is assumed that initial values of the exterior orientation parameters of the laser scanner 109 are represented as Pos_scan(Pos_x, Pos_y, Pos_z) and Att_scan(roll, pitch, yaw). The initial value (Pos_scan) represents a location of the laser scanner 109, or more exactly, a location of an optical origin of the laser scanner 109. The initial value (Att_scan) represents an attitude (direction) of the laser scanner 109. The initial values (Pos_scan, Att_scan) are described in the TS coordinate system having the origin at an optical origin of the laser positioning part 200. Current values, that is, values that are obtained in the calibration process performed before, are used for the initial values (Pos_scan, Att_scan).

Moreover, it is also assumed that correction amounts from the initial values are represented as ($\delta Pos\_x$, $\delta Pos\_y$, $\delta Pos\_z$, $\delta roll$, $\delta pitch$, $\delta yaw$) as unknown parameters. Under these conditions, the following First Formula is established by using $\Delta P$ as a separation amount of one of the scanning points, from a plane determined on the basis of the result of positioning performed by the laser positioning part 200.

$$\Delta P(Px,Py,Pz)=J[\delta Pos\_x, \delta Pos\_y, \delta Pos\_z, \delta roll, \delta pitch, \delta yaw]\hat{}T$$

First Formula:

The mathematical sign $[\ ]\hat{}T$ represents transposition, and the mathematical sign J represents a Jacobian matrix.

Assuming that:
b=ΔP(Px, Py, Pz),
A=J, and
x=[δPos_x, δPos_y, δPos_z, δroll, δpitch, δyaw]^T, an observation equation represented by the Second Formula is obtained.

$$b = Ax \qquad \text{Second Formula:}$$

Observation values of each of the scanning points, which are values of Pos_scan and Att_scan at the time each of the scanning points is obtained, are substituted into the observation equation of Second Formula. Then, a transposed matrix A^T for A is multiplied from the left side in Second Formula to obtain a normal equation of Third Formula.

$$A^{\wedge}Tb = A^{\wedge}TAx \qquad \text{Third Formula:}$$

Furthermore, an inverse matrix (A^TA)^−1 of A^TA is multiplied from the left side in Third Formula, whereby Fourth Formula is obtained.

$$(A^{\wedge}TA)^{\wedge -1} A^{\wedge}Tb = x \qquad \text{Fourth Formula:}$$

The separation amount ΔP is substituted into Fourth Formula, whereby a least square solution of x is obtained. Resultant values of δPos_x, δPos_y, δPos_z, δroll, δpitch, and δyaw are added to the initial values (Pos_scan, Att_scan), and the obtained values are used to recalculate point cloud data of the laser scanning data.

The recalculated laser scanning data is used to recalculate the separation amount ΔP of each of the scanning points from the plane, which is calculated by the plane equation calculator 114. The recalculated separation amount ΔP is used to recalculate First Formula to Fourth Formula, to calculate the unknown parameters (δPos_x, δPos_y, δPos_z, δroll, δpitch, δyaw) again.

The above calculation cycle is repeated until a predetermined convergence condition is satisfied, and optimal estimation values of the unknown parameters (δPos_x, δPos_y, δPos_z, δroll, δpitch, δyaw) are determined. For example, the convergence condition is satisfied when the unknown parameters converge or when the separation amount ΔP becomes sufficiently small.

After the optimal values of the unknown parameters (δPos_x, Pos_y, δPos_z, δroll, δpitch, δyaw) are obtained, these optimal values are used to correct the known initial values (Pos_scan, Att_scan) to obtain optimally corrected exterior orientation parameters of the laser scanner 109.

As variations in the values of the unknown parameters (δPos_x, δPos_y, δPos_z, δroll, δpitch, δyaw) become small or converge, the separation amount ΔP also converges to the minimum value. From this point of view, it is possible to find values of the unknown parameters (δPos_x, δPos_y, δPos_z, δroll, δpitch, δyaw) at a condition at which the separation amount ΔP is regarded as the minimum, also by searching for a condition at which the unknown parameters (δPos_x, δPos_y, δPos_z, δroll, δpitch, δyaw) converge. In an ideal case, there exists a condition at which the separation amount ΔP is zero. However, the separation amount ΔP may not be zero due to various kinds of margin of errors.

As described above, the exterior orientation parameters of the laser scanner 109 when the separation amount dn (refer to FIG. 5) of each of the scanning points is minimum, are calculated, and a more optimized relationship of the exterior orientation parameters between the laser positioning part 200 and the laser scanner 109 is obtained. That is, calibration relating to the exterior orientation parameters between the laser positioning part 200 and the laser scanner 109 is performed.

Multiple planes having different normal directions are preferably used for calculation of the exterior orientation parameters. This is because a margin of error still exists in the relative relationship of parallel position between the laser positioning part 200 and the laser scanner 109 even when the plane, which is determined by the laser positioning part 200, coincides with the scanning data of the laser scanner 109. However, this margin of error is decreased by optimizing the exterior orientation parameters using multiple planes having different normal vectors.

The above description exemplifies a case of calculating and optimizing the exterior orientation parameters of the laser scanner 109. In the embodiment of the technology, it is important to calibrate and determine the relationship between the exterior orientation parameters of the laser positioning part 200 including the optical system 201 and the exterior orientation parameters of the laser scanner 109. This is because there can be a range of error in comparison and interchanging of data of the laser positioning part 200 and data of the laser scanner 109, unless the relationship of the exterior orientation parameters between the laser positioning part 200 and the laser scanner 109 is determined. In view of this, in one example, exterior orientation parameters of the laser positioning part 200 including the optical system 201 may be corrected. Alternatively, in another example, both of the exterior orientation parameters of the laser positioning part 200 including the optical system 201 and the exterior orientation parameters of the laser scanner 109 may be corrected.

An artificial structure such as a wall surface of a building, a plate member prepared as a target for the calibration, and a cubic structure as illustrated in FIG. 4 may be used to obtain the target plane. In a case of preparing a target for the calibration, a structure with multiple planes having different normal vectors is preferable. Alternatively or additionally, an object that exists in nature may also be used to obtain the plane for the calibration. Note that, in a case in which the state of the plane is not known, an object having the most possible planarity should be selected as the target plane for the calibration.

The calibrated condition appropriateness judging unit 117 judges the appropriateness of the calibrated condition relating to the laser positioning part 200 and the laser scanner 109. In a case in which the calibrated condition relating to the laser positioning part 200 and the laser scanner 109 is "appropriate", the exterior orientation parameters of both of the laser positioning part 200 and the laser scanner 109 are obtained at acceptable accuracies.

In this case, even if the exterior orientation parameters of one or both of the laser positioning part 200 and the laser scanner 109 contain a margin of error, this falls in an acceptable range and does not cause problems in matching and interchanging of data between the laser positioning part 200 and the laser scanner 109, or this may generate a range of error in the matching and the interchanging of the data, but this error still falls in an acceptable range.

On the other hand, in a case in which the calibrated condition relating to the laser positioning part 200 and the laser scanner 109 is "inappropriate", the exterior orientation parameters of at least one of the laser positioning part 200 and the laser scanner 109 contain a margin of error at an unacceptable degree. In this case, problems will occur in matching and interchanging of data between the laser positioning part 200 and the laser scanner 109, resulting in generation of a range of error in integrated data of the laser positioning part 200 and the laser scanner 109 to an unacceptable degree.

The exterior orientation parameters of both of the laser positioning part 200 and the laser scanner 109 and the relationship of the exterior orientation parameters between the laser positioning part 200 and the laser scanner 109 are determined in advance in a preliminary calibration process. However, various kinds of causes, such as variation with time, may generate deviations from appropriate values and generate a range of error, in the values of the exterior orientation parameters of the laser scanner 109 relative to the laser positioning part 200. Alternatively or additionally, these various kinds of causes may generate a deviation from an appropriate value and generate a margin of error, in the relationship of the exterior orientation parameters between the laser positioning part 200 and the laser scanner 109. In a case in which this margin of error is so great as to be not negligible, the calibrated condition relating to the laser positioning part 200 and the laser scanner 109 is in an inappropriate condition. The judgement of the appropriateness of the calibrated condition is performed by the calibrated condition appropriateness judging unit 117.

The judgement of the appropriateness of the calibrated condition is performed on the basis of the separation amount, which is calculated by the separation amount calculator 115. In a specific example, assuming that an average of the separation amounts d of the scanning points is represented as $\Sigma dn/n$ in which "n" is the number of the scanning points, the calibrated condition is judged as being "appropriate" if $\Sigma dn/n$ is smaller than a predetermined threshold value, whereas the calibrated condition is judged as being "inappropriate" if $\Sigma dn/n$ is the predetermined threshold value or greater. The threshold value serves as a criterion for the judgement and is set depending on an acceptable degree of range of error.

Figure 6:
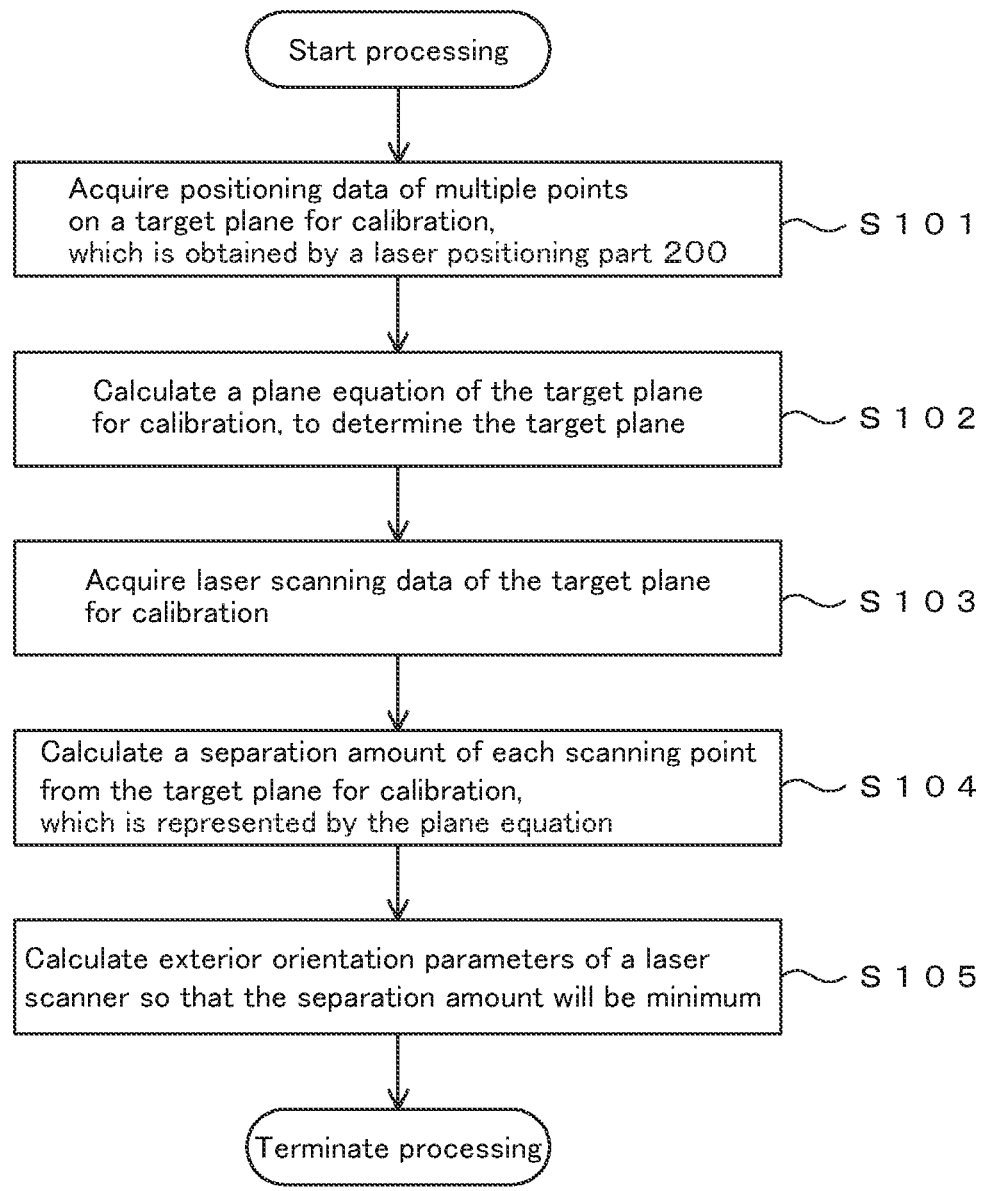
FIG. 6 is a flowchart showing an example of a processing procedure.

The movement controlling unit 121 comprehensively controls the operation of the TS 100. For example, the control relating to a processing shown in FIG. 6 is performed by the movement controlling unit 121. The storage 122 stores information necessary to operate the TS 100, such as data and programs, and also stores surveying data obtained as a result of the operation of the TS 100.

EXAMPLE OF PROCESSING

FIG. 6 is a flowchart showing an example of a processing procedure performed by the calibration processing part 110. Programs for executing the processing shown in FIG. 6 are stored in the storage 122 or an appropriate storage medium or both. The processing procedure is executed under control of the movement controlling unit 121.

A calibration process using the target plane 301 for the calibration illustrated in FIG. 4 is exemplified below. After the processing starts, positioning points 303 are positioned first by the laser positioning part 200, and the resultant data of the positioning is acquired by the positioning-point location data acquiring unit 111 (step S101). In the case shown in FIG. 4, six positioning points 303 are positioned. Coordinates of the positioning point 303 are described in the TS coordinate system, which is a three-dimensional coordinate system fixed relative to the TS 100.

The operation for positioning the positioning point 303 is conducted by an operator by using the TS 100. At this time, the operator sights a point on the target plane 301 for the calibration, by viewing through the eyepiece 17. The operator selects six points on the target plane 301 as positioning points 303 and positions the selected positioning points 303.

After the six positioning points 303 are positioned, a plane that fits to the six positioning points 303 is determined (step S102). This process is performed by the plane equation calculator 114. This process performs calculation of a plane equation of a plane that fits to the six positioning points 303 in the TS coordinate system.

Thereafter, laser scanning is performed on the target plane 301 for the calibration, by using the laser scanner 109, to obtain scanning data of the target plane 301 for the calibration. This scanning data is acquired by the scanning data acquiring unit 112 (step S103).

Next, on the basis of the principle shown in FIG. 5, a separation amount of the respective scanning points, which are contained in the scanning data obtained in step S103, from the plane, which is calculated in step S102, is calculated (step S104). This process is performed by the separation amount calculator 115.

Then, the exterior orientation parameters of the laser scanner 109 are calculated so that the separation amount will be minimum (step S105). This process is performed by the exterior orientation parameter calculator 116. The process in FIG. 6 performs optimization calculation of the exterior orientation parameters of the laser scanner 109 so that the separation amount will be minimum. This process is performed to correct the exterior orientation parameters of the laser scanner 109 relative to the laser positioning part 200. Alternatively, the exterior orientation parameters of the laser positioning part 200 may be calculated so that the separation amount will be minimum. Further alternatively, the exterior orientation parameters of both of the laser positioning part 200 and the laser scanner 109 may be calculated so that the separation amount will be minimum.

First Modification Example

The separation amount of the scanning point, which is obtained by the laser scanner 109, from the plane, which is determined by using the function of the laser positioning part 200, may be calculated as described below. That is, assuming that the plane is referred as a "first plane", a plane that fits to the scanning point contained in the laser scanning data is calculated as a second plane, and a separation amount between the first plane and the second plane is calculated.

The separation amount is calculated at a point on a grid set on the first plane or the second plane. The smaller the grid interval, the greater the calculation accuracy, but the amount of calculation increases accordingly. The interval of the grid may be 1 to 30 cm, for example. Also in this modification example, it is preferable to use two or more planes that have different normal vectors.

Second Modification Example

In the processing shown in FIG. 6, instead of the process in step S105, the appropriateness of the calibrated condition may be judged on the basis of the separation amount obtained in step S 104. In this case, the appropriateness of the calibrated condition between the laser positioning part 200 and the laser scanner 109 is judged by the calibrated condition appropriateness judging unit 117. The result of the judgment is shown on the displays 18 and 19. Additionally, in one example, the result of the judgment may be transmitted to the outside of the TS 100.

Third Modification Example

A curved plane can also be used as the target plane for the calibration exemplified in FIG. 4. In this case, a curved plane with known mathematical specification, such as a curvature, is prepared as the target plane for the calibration. The mathematical structure of the target plane for the calibration is obtained in advance. For example, an equation of the curved plane and detailed numerical information are preliminarily obtained.

In the calibration process, multiple points that are necessary to identify the prepared target plane for the calibration, normally, three or more points, are positioned by the laser positioning part 200, and the prepared target plane for the calibration that fits to the positioned points is identified. At this stage, an indeterminate coefficient in a plane equation of the prepared target plane for the calibration is determined.

Thereafter, laser scanning is performed on the identified target plane for the calibration, by using the laser scanner 109, to obtain a large number of scanning points on the identified target plane for the calibration. Under these conditions, a separation amount of the respective multiple scanning points, which are obtained by the laser scanning, from the identified target plane for the calibration is calculated. At this time, the numerical specification of the identified target plane for the calibration is already determined. Then, the exterior orientation parameters of the laser scanner 109 are calculated so that the separation amount will be minimum. The curved plane may be a spherical surface, an ellipsoid, a hyperboloid, a cylindrical surface, a conical surface, or any other curved surface.

Fourth Modification Example

The exterior orientation parameters of the laser positioning part 200 can be corrected and be optimized by using the First Formula to Fourth Formula. In this case, after the unknown parameters ($\delta Pos\_x$, $Pos\_y$, $\delta Pos\_z$, $\delta roll$, $\delta pitch$, $\delta yaw$) of the laser positioning part 200 are calculated, the positioning points 303 and the plane equation are recalculated by using the calculated unknown parameters. In this condition, the First Formula to Fourth Formula are calculated again. This cycle is repeated until a predetermined convergence condition is satisfied, and optimal values of the unknown parameters ($\delta Pos\_x$, $\delta Pos\_y$, $\delta Pos\_z$, $\delta roll$, $\delta pitch$, $\delta yaw$) relating to the laser positioning part 200 are determined. For example, the convergence condition is satisfied when the unknown parameters converge or when the separation amount $\Delta P$ becomes sufficiently small.

To correct the exterior orientation parameters of both of the laser positioning part 200 and the laser scanner 109, unknown parameters ($\delta Pos\_x$, $\delta Pos\_y$, $\delta Pos\_z$, $\delta roll$, $\delta pitch$, $\delta yaw$) of both of the laser positioning part 200 and the laser scanner 109 are corrected alternately.

OTHER MATTERS

The present invention can also be used in a surveying device having a TS and a laser scanner in a combined manner with the optical origins thereof made to coincide with each other. Even if the optical origins of the TS and the laser scanner are made to coincide with each other by design, and a product is finished in consideration of part accuracy and assembling accuracy, timing of measuring a direction performed by the laser scanner and timing of acquiring positioning data can differ, and measurement errors can occur. From this point of view, this surveying device also requires the calibration process to obtain reliable interchangeability of data between the TS positioning function and the laser scanner. The present invention can be used in such cases.

The present invention can be used in a surveying device having both a function of TS and a function of a laser scanner.

What is claimed is:

1. A surveying device comprising:
   an optical system to be used for sighting a positioning target;
   a laser positioning part configured to emit laser light via the optical system to the positioning target to position the positioning target;
   a laser scanner configured to perform laser scanning of a specific plane to obtain multiple scanning points; and
   a processor or circuitry configured to:
   determine a location of the specific plane on a basis of a result of the positioning performed by the laser positioning part;
   calculate a separation amount of the respective multiple scanning points obtained by the laser scanner, from the specific plane of which the location is determined; and
   calculate exterior orientation parameters of one or both of the laser positioning part and the laser scanner on a basis of the calculated separation amount.

2. The surveying device according to claim 1, wherein the specific plane is selected from among multiple planes having different normal vectors.

3. The surveying device according to claim 1, wherein the laser positioning part positions three or more points on the specific plane to determine the location of the specific plane.

4. The surveying device according to claim 3, wherein a distribution area of the three or more points and a laser scanning area of the laser scanner overlap.

5. The surveying device according to claim 4, wherein the laser scanning area of the laser scanner is set within the distribution area of the three or more points.

6. The surveying device according to claim 1, further comprising a noise eliminating part that calculates a fitting plane to which the multiple scanning points fit, and the noise eliminating part eliminating a scanning point, of which a separation amount from a fitting plane is a specified value or greater, as a noise point from among the multiple scanning points.

7. The surveying device according to claim 6, wherein the separation amount is a distance between the specific plane and the fitting plane that fits to the multiple scanning points obtained by the laser scanner.

8. A surveying device comprising:
   an optical system to be used for sighting a positioning target;
   a laser positioning part configured to emit laser light via the optical system to the positioning target to position the positioning target;
   a laser scanner configured to perform laser scanning of a specific plane to obtain multiple scanning points; and
   a processor or circuitry configured to:
   determine a location of the specific plane on a basis of a result of the positioning performed by the laser positioning part;
   calculate a separation amount of the respective multiple scanning points obtained by the laser scanner, from the specific plane of which the location is determined; and
   judge an appropriateness of a calibrated condition relating to exterior orientation parameters of the laser positioning part and the laser scanner, on a basis of the calculated separation amount.

9. The surveying device according to claim 8, wherein the specific plane is selected from among multiple planes having different normal vectors.

10. The surveying device according to claim 8, wherein the laser positioning part positions three or more points on the specific plane to determine the location of the specific plane.

11. The surveying device according to claim 8, further comprising a noise eliminating part that calculates a fitting plane to which the multiple scanning points fit, and the noise eliminating part eliminating a scanning point, of which a separation amount from a fitting plane is a specified value or greater, as a noise point from among the multiple scanning points.

12. The surveying device according to claim 11, wherein the separation amount is a distance between the specific plane and the fitting plane that fits to the multiple scanning points obtained by the laser scanner.

13. A calibration method of a surveying device, comprising:
- determining a location of a specific plane by positioning three or more points on the specific plane by using a laser positioning part;
- performing laser scanning of the specific plane by a laser scanner to obtain multiple scanning points;
- calculating a separation amount of the respective multiple scanning points obtained by the laser scanning, from the specific plane of which the location is determined; and
- calculating exterior orientation parameters of one or both of the laser positioning part and the laser scanner on a basis of the separation amount.

* * * * *